Patented Oct. 9, 1923.

1,470,552

UNITED STATES PATENT OFFICE.

HORACE G. BYERS, OF MONTCLAIR, NEW JERSEY, ASSIGNOR TO BROWN COMPANY, OF BERLIN, NEW HAMPSHIRE, A CORPORATION OF MAINE.

CATALYST AND METHOD OF MAKING SAME.

No Drawing.  Application filed September 28, 1921. Serial No. 503,926.

*To all whom it may concern:*

Be it known that I, HORACE G. BYERS, a citizen of the United States, residing at Montclair, in the county of Essex and State of New Jersey, have invented new and useful Improvements in Catalysts and Methods of Making Same, of which the following is a specification.

This invention has relation to catalysts for use, (for example, in the hydrogenation of fatty acids and their glycerides or esters. Its object is to provide a catalytic material, which is deposited on a very finely-divided highly-porous carrier, which is highly active and efficient for the purposes stated, and which has a high metal content when reduced.

I utilize sugar characoal as the carrier. This is prepared by causing sugar (preferably granulated) to react with concentrated sulphuric acid. The resultant very porous charcoal thereby produced is washed free of acid and soluble matter, and dried, after which it is crushed or ground. The charcoal may then be saturated with a solution of nickel nitrate, after which it is again dried. Then the mass is treated with an equivalent amount of caustic soda solution, resulting in the precipitation of nickel hydrate on the charcoal, after which the mass is thoroughly washed to remove the soluble sodium nitrate solution resulting from the reaction. The mass is then dried and reduced with hydrogen at a temperature not above 360° C.

A catalytic material, thus produced on sugar charcoal, has an excellent activity and is highly efficient in the partial or complete hydrogenation of animal and vegetable oils. A sample of the material after reduction showed a nickel content of 73.6%.

Instead of precipitating the nickel from a nitrate solution in the manner described, the nitrous oxide may be expelled by heat or the nickel may be precipitated from a nickel salt on the charcoal carrier by any other suitable method. For example, the charcoal, after being soaked in a quantity of nickel nitrate solution, may be treated with an equivalent quantity of sodium carbonate solution, to effect the precipitation of nickel carbonate thereon, or some other soluble salt may be used in place of the nitrate and the carbonate, or nickel hydrate may be precipitated in a similar manner.

An advantage secured by sugar charcoal prepared by causing concentrated sulphuric acid to react with sugar is that the interstices of the resulting charcoal are very large, thereby greatly increasing the active surface of the catalyzer precipitated on and in the charcoal. The charcoal is exceedingly light and fluffy, and by its use a more highly active catalyzer is secured than when ordinary charcoal is employed such as wood charcoal.

What I claim is:—

1. A catalytic material consisting of sugar charcoal produced by the reaction of sugar with a concentrated acid and having a metal catalyst precipitated thereon.

2. A catalytic material consisting of sugar charcoal produced by the reaction of sugar with a concentrated acid and having nickel precipitated thereon.

3. A method of producing a catalytic material, comprising treating sugar with a concentrated acid to produce charcoal; washing, drying and crushing such charcoal; precipitating a compound of a catalytic metal thereon, and reducing the compound with hydrogen.

In testimony whereof I have affixed my signature.

HORACE G. BYERS.